United States Patent
Cheng

(10) Patent No.: US 10,670,898 B2
(45) Date of Patent: Jun. 2, 2020

(54) DISPLAY MODULE AND ELECTRONIC DEVICE

(71) Applicant: GUANGDONG OPPO MOBILE TELECOMMUNICATIONS CORP., LTD., Dongguan, Guangdong (CN)

(72) Inventor: Caiquan Cheng, Guangdong (CN)

(73) Assignee: Guangdong OPPO Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 16/183,941

(22) Filed: Nov. 8, 2018

(65) Prior Publication Data

US 2019/0196248 A1  Jun. 27, 2019

(30) Foreign Application Priority Data

Dec. 26, 2017  (CN) .......................... 2017 1 1433275

(51) Int. Cl.
*G02F 1/1333* (2006.01)
*G06F 1/16* (2006.01)
*H04M 1/02* (2006.01)
*G02F 1/1345* (2006.01)
*G02F 1/13357* (2006.01)

(52) U.S. Cl.
CPC .... *G02F 1/133308* (2013.01); *G02F 1/13452* (2013.01); *G06F 1/1637* (2013.01); *H04M 1/0266* (2013.01); *G02F 1/133603* (2013.01); *G02F 2001/133322* (2013.01); *G02F 2001/133331* (2013.01); *H04M 1/0277* (2013.01)

(58) Field of Classification Search
CPC ............. H04M 1/0266; H04M 1/0274; H04M 1/0277; G02F 1/13454; G02F 1/133308; G02F 1/13456; G02F 1/13452
See application file for complete search history.

(56) References Cited

U.S. PATENT DOCUMENTS

| | | | |
|---|---|---|---|
| D819,591 S | 6/2018 | Kwon et al. | |
| 2017/0126979 A1 | 5/2017 | Evans, V et al. | |
| 2017/0289324 A1* | 10/2017 | Yeo | G03B 29/00 |
| 2018/0011373 A1* | 1/2018 | Zhou | G02F 1/1339 |

FOREIGN PATENT DOCUMENTS

| | | |
|---|---|---|
| CN | 105206212 A | 12/2015 |
| CN | 106817451 A | 6/2017 |
| CN | 107315295 A | 6/2017 |
| CN | 107247379 A | 10/2017 |
| CN | 107248374 A | 10/2017 |
| CN | 107340660 A | 11/2017 |

(Continued)

OTHER PUBLICATIONS

First Office Action issued in corresponding China application No. 201711433275.4, dated Mar. 1, 2019 (15 pages).

(Continued)

*Primary Examiner* — Jessica M Merlin

(57) ABSTRACT

A display module includes a liquid crystal layer defining a notch at a border thereof; and a drive circuit module disposed at the border of the liquid crystal layer, wherein the drive circuit is separated by the notch. An electronic device having the display module is also provided.

20 Claims, 8 Drawing Sheets

(56) References Cited

FOREIGN PATENT DOCUMENTS

| CN | 206741370 U | 12/2017 |
|----|-------------|---------|
| CN | 108154812 A | 6/2018 |
| KR | 20160083375 A | 7/2016 |

OTHER PUBLICATIONS

Second Office Action issued in corresponding China application No. 201711433275.4, dated May. 29, 2019 (8 pages).
International Search Report and Written Opinion issued in corresponding International application PCT/CN2018/117538, dated Mar. 7, 2019 (12 pages).
European Search Report issued in corresponding European application No. 18208502.7-1210, dated Feb. 11, 2019 (11 pages).

* cited by examiner

DISPLAY MODULE AND ELECTRONIC DEVICE

CROSS-REFERENCE TO RELATED APPLICATION

This application claims priority to a Chinese application No. 201711433275.4 filed on Dec. 26, 2017, titled "DISPLAY MODULE AND MOBILE TERMINAL". The entirety of the above-mentioned application is hereby incorporated by reference herein.

TECHNICAL FIELD

The present disclosure relates to the field of consumer devices in general. More particularly, and without limitation, the disclosed embodiments relate to a display panel and an electronic device.

BACKGROUND

In recent years, an electronic device, such as a mobile phone having a bigger display panel becomes popular around the world. Therefore, it is desirable to provide a display module with a bigger display area.

SUMMARY

In accordance with an aspect, in one embodiment of the present disclosure, a display module is provided. The display module can include a liquid crystal display panel. The liquid crystal display (LCD) panel includes a liquid crystal layer defining a notch at a border thereof; and a drive circuit module disposed at the border of the liquid crystal layer, wherein the drive circuit module is separated by the notch.

In another aspect, another display module is provided. The display module can include a cover and a liquid crystal display panel. The cover can include a visible effective display region, and a visible non-display region coupled to the visible effective display region. The liquid crystal display panel is coupled to the cover. The liquid crystal display panel can include a liquid crystal layer face the visible effective display region, and a drive circuit module around the notch and coupled to the liquid crystal layer. The liquid crystal layer can define a notch at a border thereof, and the visible non-display region faces the notch.

In further another aspect, an electronic device is provided. The electronic device can include a liquid crystal display panel. The liquid crystal display (LCD) panel includes liquid crystal layer defining a notch at a border thereof; and a drive circuit module disposed at the border of the liquid crystal layer, wherein the drive is separated by the notch.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

DETAILED DESCRIPTION OF EMBODIMENTS

Figure 1:
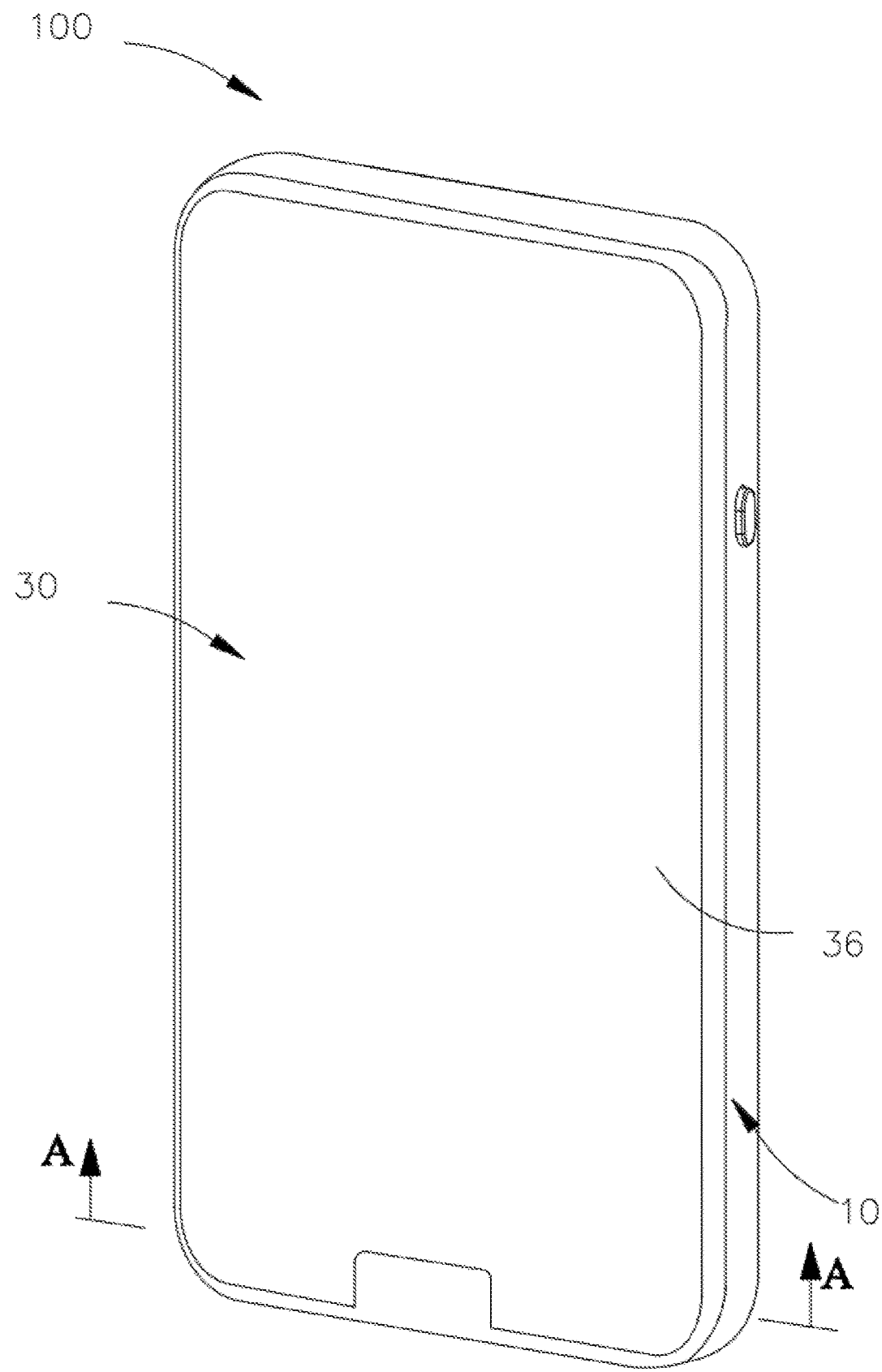
FIG. 1 illustrates a schematic perspective view of an electronic device, in accordance with an embodiment of the present disclosure.

This description and the accompanying drawings that illustrate exemplary embodiments should not be taken as limiting. Various mechanical, structural, electrical, and operational changes may be made without departing from the scope of this description and the claims, including equivalents. In some instances, well known structures and techniques have not been illustrated or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically illustrated or described. For example, if an element is described in detail with reference to one embodiment and is not described with reference to a second embodiment, the element may nevertheless be claimed as included in the second embodiment.

As used herein, a "communication terminal" (or simply a "terminal", "electronic device") can include, but is not limited to, a device that is configured to receive/transmit communication signals via wire line connection, such as via public-switched telephone network (PSTN), digital subscriber line (DSL), digital cable, a direct cable connection, and/or another data connection/network, and/or via wireless interface with, for example, a cellular network, a wireless local area network (WLAN)1 a digital television network such as a DVB-H network, a satellite network, an AM/FM broadcast transmitter, and/or another communication terminal. A communication terminal that is configured to communicate over a wireless interface may be referred to as a "wireless communication terminal," a "wireless terminal" and/or a "mobile terminal", and/or an "electronic device". Examples of electronic devices include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that can include a radio telephone transceiver.

In accordance with an aspect, in one embodiment of the present disclosure, a display module is provided. The display module can include a liquid crystal display panel. The liquid crystal display (LCD) panel includes a liquid crystal layer defining a notch at a border thereof; and a drive circuit module disposed at the border of the liquid crystal layer, wherein the drive is separated by the notch.

In another aspect, another display module is provided. The display module can include a cover and a liquid crystal display panel. The cover can include a visible effective display region, and a visible non-display region coupled to the visible effective display region. The liquid crystal display panel stacked to the cover. The liquid crystal display panel can include a liquid crystal layer face the visible effective display region, and a drive circuit module around the notch and coupled to the liquid crystal layer. The liquid crystal layer can define a notch at a border thereof, and the visible non-display region faces the notch.

In further another aspect, an electronic device is provided. The electronic device can include a liquid crystal display panel. The liquid crystal display (LCD) panel having: a liquid crystal layer defining a notch at a border thereof; and a drive circuit module disposed at the border of the liquid crystal layer, wherein the drive is separated by the notch.

Because the liquid crystal display panel defines the notch to receive a function module of the electronic device, the cover only forms a visible non-display region corresponding to the notch. A visible effective display region can be formed and can extend to two opposite sides of the visible non-display region. As a result, two corners of the cover which is disposed at opposite sides of the visible non-display region can be configured to produce visible images.

In operation, a whole display area (considered as the visible effective display region) of the LCD panel extends from a main display area to two additional display areas at opposite sides of the notch. The main display area and the additional display area each are generally rectangular. As such, the overall display area of the LCD panel is increased, although a notch is defined in the LCD panel to receive the function module.

Figure 2:
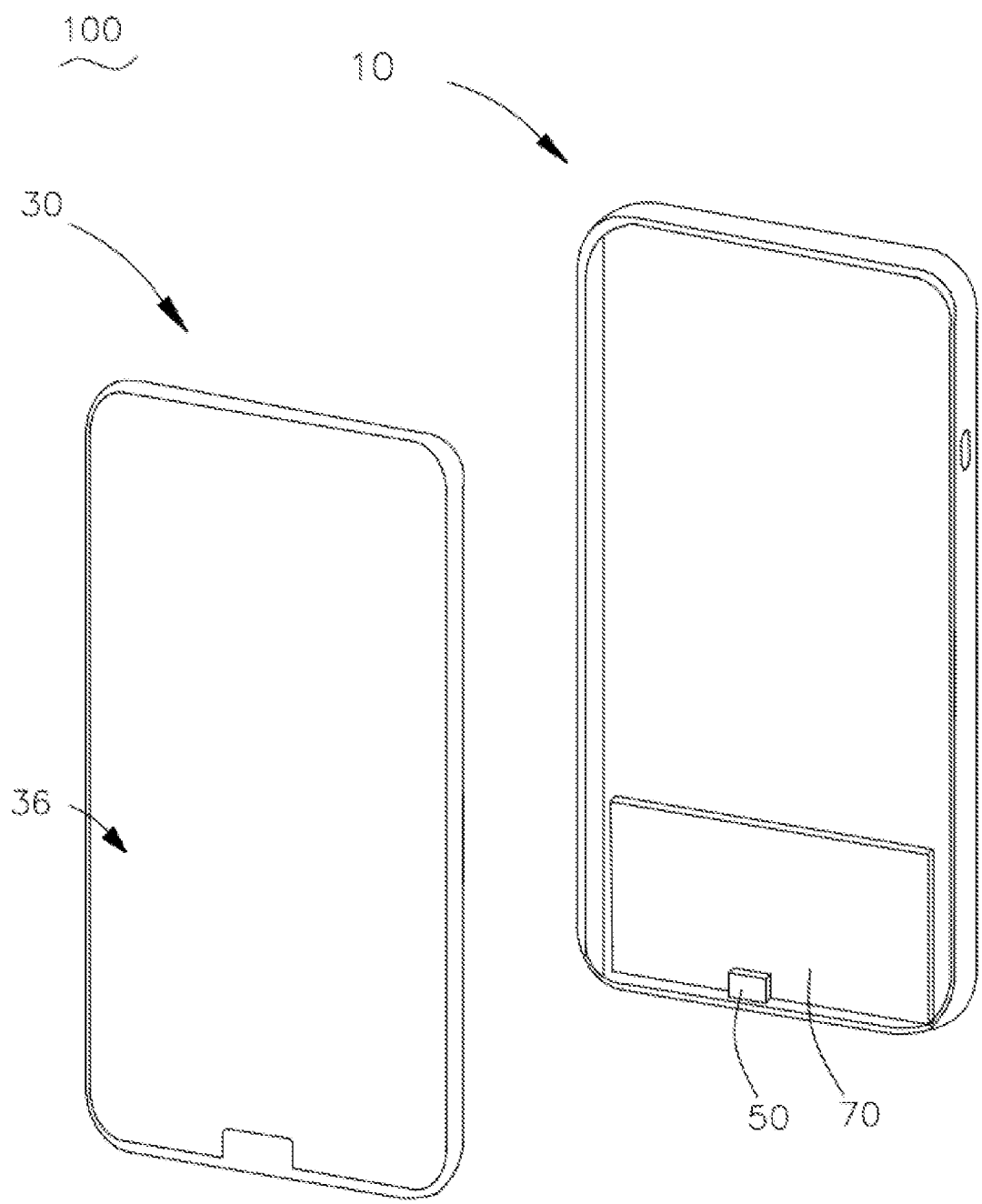
FIG. 2 illustrates a schematic exploded view of the electronic device of FIG. 1.

As illustrated in FIG. 1 and FIG. 2, an electronic device 100 in accordance with an embodiment of the present disclosure is provided. The electronic device 100 can be any device with communication function and storage function, such as: a tablet, a mobile phone, an e-reader, a remote control, a personal computer (PC), a notebook computer, car device, a network television, a wearable device smart, or other smart devices with network capabilities. In a typical example of this embodiment, the electronic device 100 can be a mobile phone.

The electronic device 100 can include a housing 10 and a display module 30. The housing 10 is configured to secure the display module 30. In alternative embodiment, a number of electronic components, such as chips, an accelerometer, etc., may be introduced and secured in the housing 10.

Figure 3:
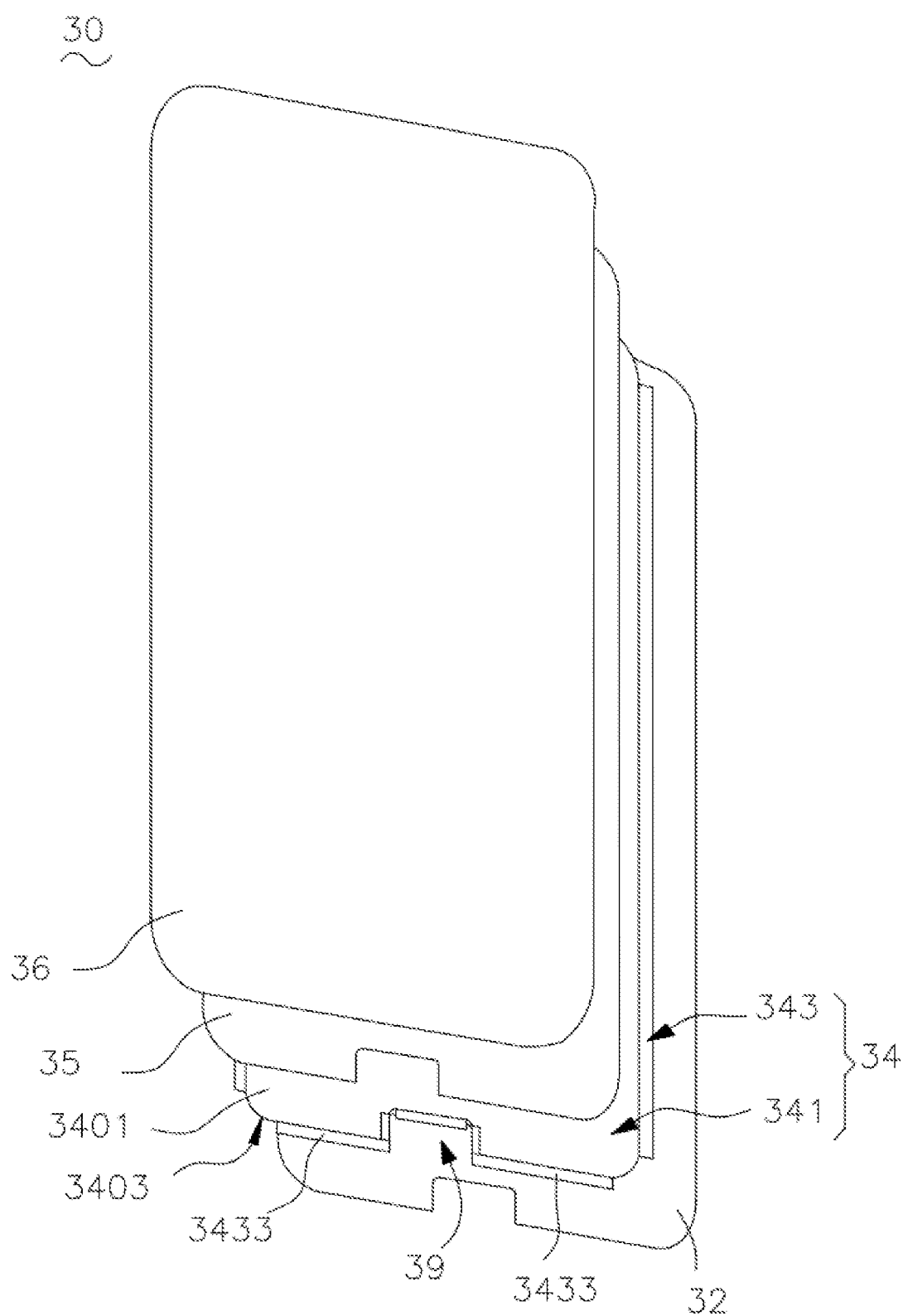
FIG. 3 illustrates a schematic exploded view of a display module of the electronic device of FIG. 2.

As illustrated in FIG. 3, in this embodiment, the display module 30 can be a liquid crystal display (LCD). The display module 30 can have a stacked structure, and the display module 30 may in sequence include a backlight 32, a LCD panel 34, and a cover 36. The LCD panel 34 can be arranged between the backlight 32 and the cover 36. In this embodiment, the display module can further include a resin layer 35. The resin layer 35 may be arranged between the LCD panel 34 and the cover 36. The resin layer 35 can be configured to connect the cover 36 to the LCD panel 34.

Figure 4:
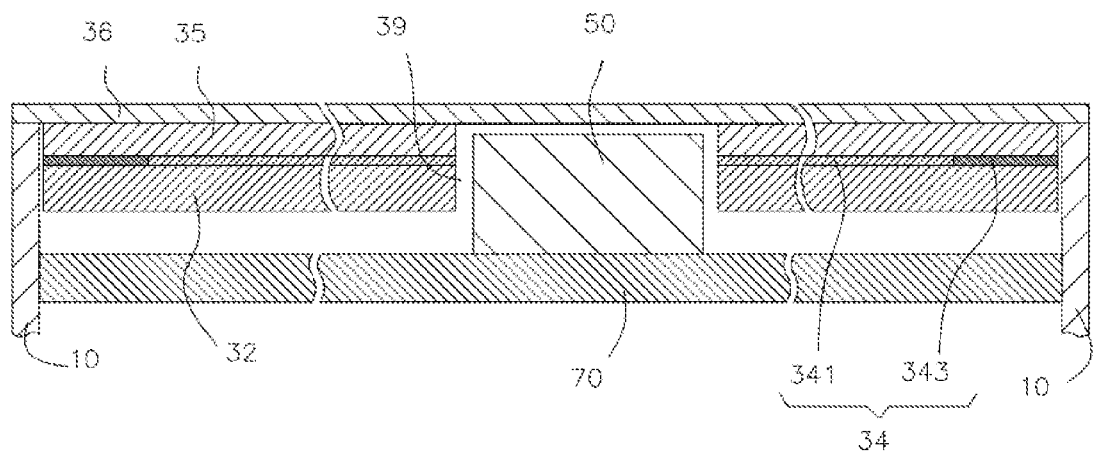
FIG. 4 illustrates a schematic cross-sectional view of the display module of FIG. 1 taken along a line A-A
Figure 5:
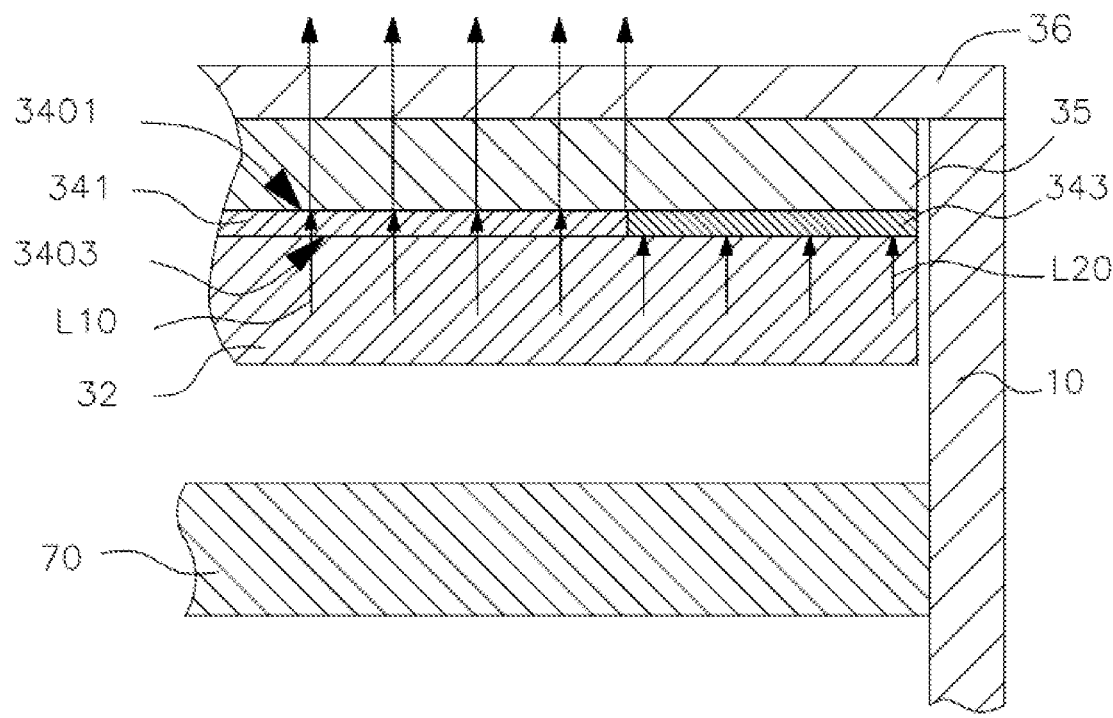
FIG. 5 illustrates a schematic partial enlargement view of the display module of FIG. 4.

As illustrated in FIG. 3, FIG. 4 and FIG. 5, the backlight 32, the LCD panel 34, and the resin layer 35 can be received in the housing 10 in a stacked manner. In this embodiment, the LCD panel 34 is sandwiched between the resin layer 35 and the backlight 32.

In operation, the backlight 32 emits light toward the LCD panel 34. Generally, the backlight 32 can include a light source such as a cold cathode fluorescent lamp (CCFL) and a light emitting diode (LED), etc.

The LCD panel 34 can include a liquid crystal layer 341 and a drive circuit module 343 surrounding the crystal layer 341. The liquid crystal layer 341 can include a number of liquid crystals. The drive circuit module 343 can be located at a periphery of the liquid crystal layer 341. When the backlight 32 emits light to the LCD panel 34, on one hand, the liquid crystals twist and untwist at varying degrees to allow light L10 to pass through, thus producing a visible image. On the other hand, light L20 is blocked from passing through by the drive circuit module 343.

Referring to FIG. 5, the cover 36 can be disposed on the resin layer 35. A periphery of the cover 36 can be coupled to the housing 10. In this embodiment, the cover 36 can be made of optical glass such as BK7 or resin material such as acrylic resin and polycarbonate resin.

As illustrated in FIG. 4, in this embodiment, the electronic device 100 can further include a function module 50 and a printed circuit board (PCB) 70 (also illustrated in FIG. 2). The PCB 70 can be received in the housing 10, and can be disposed close to the backlight 32 (see FIG. 5). The LCD panel 34 can be electrically coupled to the PCB 70 via the drive circuit module 343. The function module 50 can be mounted to the PCB 70 and received in the display module 30. In this embodiment, the function module 50 can be a camera module, a sensor module, a receiver module, a fingerprint identification module, or other modules with a specific function.

In this embodiment, as shown in FIG. 4, the display module 30 can define a notch 39 at a bottom side thereof facing the PCB 70. The notch 39 is configured to receive the function module 50. The notch 39 can penetrate the backlight 32, the LCD panel 34 (i.e., the liquid crystal layer 341 of the LCD panel 34), and the resin layer 35 except the cover 36. In assembly, the function module 50 can be coupled to the PCB 70. The function module 50 protrudes in the notch 39 toward the cover 36. In this embodiment, the function module 50 may be disposed close to the cover 36 but spaced from the cover 36. In alternative embodiments, the function module 50 may protrude toward the cover 36 and further touch the cover 36.

Figure 6:
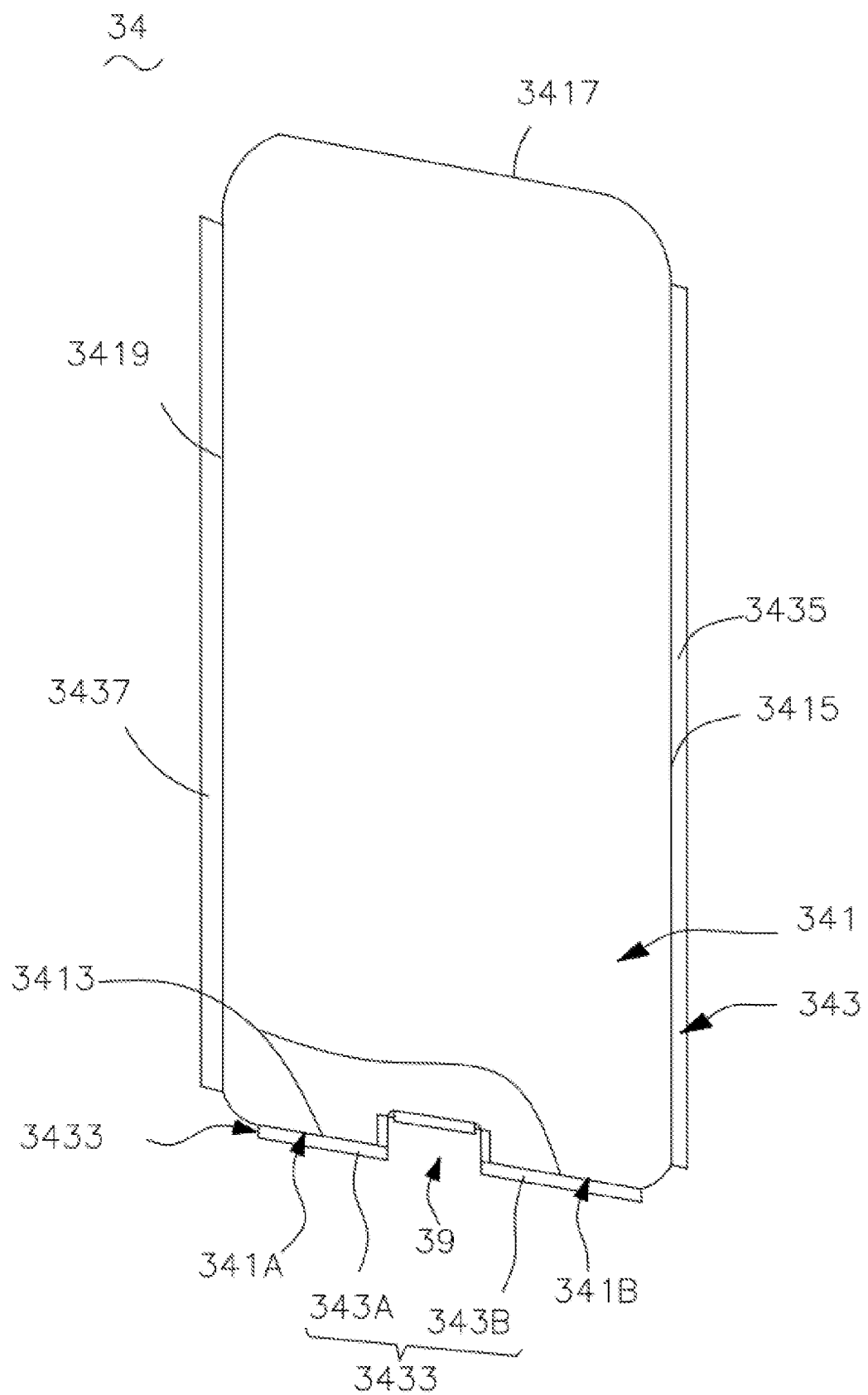
FIG. 6 illustrates a schematic perspective view of a liquid crystal display panel of the display module of FIG. 3.

The liquid crystal layer 341 is substantially rectangular. As shown in FIG. 6, the liquid crystal layer 341 can include a first border 3413, a second border 3415, a third border 3417, and a fourth border 3419. The first border 3413 and the third border 3417 are substantially parallel to each other. The second border 3415 and the fourth border 3419 are substantially parallel to each other. The notch 39 can be defined at the first border 3413 of the liquid crystal layer 341.

Figure 7:
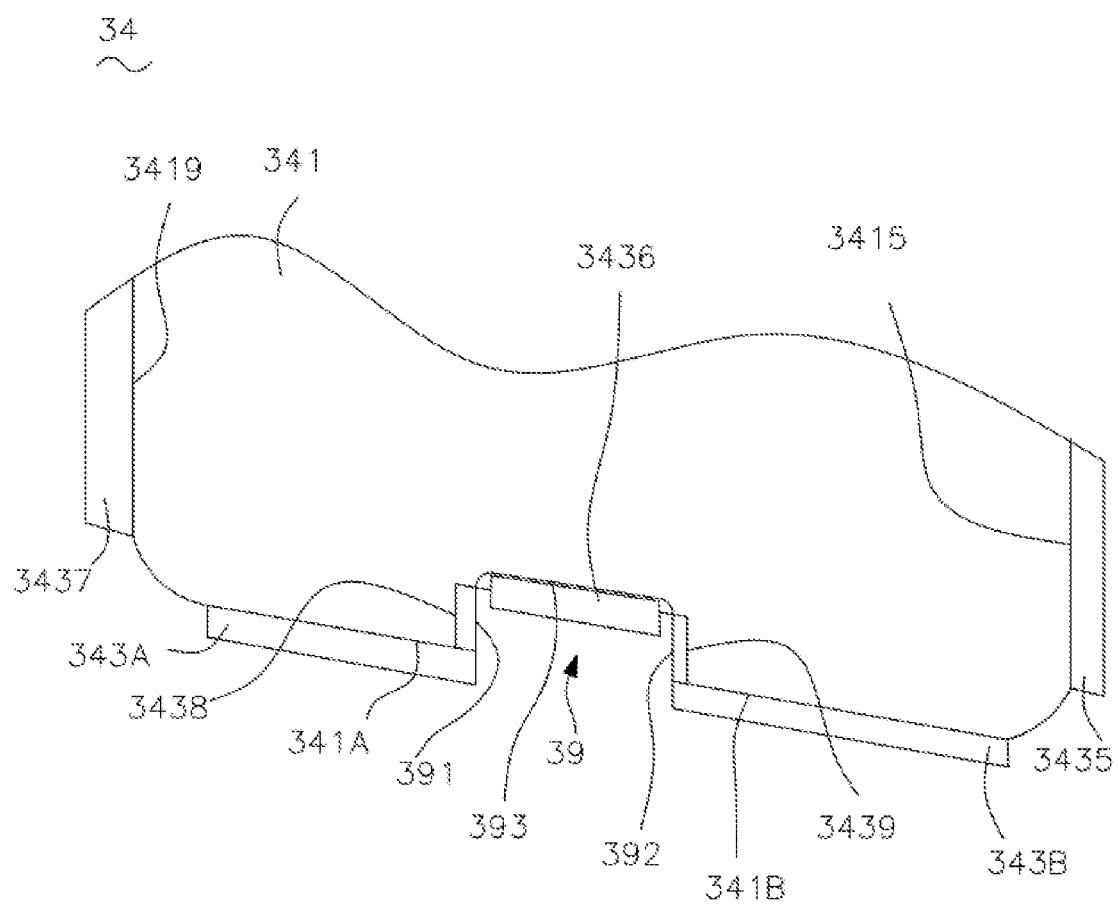
FIG. 7 illustrates a schematic partial enlargement view of the liquid crystal display panel of FIG. 6.

As illustrated in FIG. 7, the first border 3413 is separated by the notch 39. That is, the first border 3413 includes a sub-border 341A and a sub-border 341B. The sub-border 341A and the sub-border 341B are spaced from each other by the notch 39. In this embodiment, the liquid crystal layer 341 further includes a first lateral side 391, a second lateral side 392, and a bottom side 393 in the notch 39. The first lateral side 391 is connected to the sub-border 341A, and is perpendicular to the sub-border 341A. The second lateral side 392 is connected to the sub-border 341B, and is perpendicular to the second lateral side 341B. The bottom side 393 is connected between the sub-border 341A and the sub-border 341B. In this embodiment, the first lateral side 391 and the second lateral side 392 are substantially perpendicular to the bottom side 393.

Referring to FIG. 6 and FIG. 7, the drive circuit module 343 includes a first circuit 3433, a second circuit 3435, and a third circuit 3437. The first circuit 3433 can be disposed along the first border 3413, and the first circuit 3433 is attached to the first border 3413. The first circuit 3433 is configured to apply voltage across the liquid crystal layer 341, such that the liquid crystals of the liquid crystal layer 341 can be twisted or untwisted according to the voltage. The second circuit 3435 can be disposed along the second border 3415, and the second circuit 3435 is attached to the second border 3415. The third circuit 3437 can be disposed along the fourth border 3419, and the third circuit 3437 is attached to the fourth border 3419. The second circuit 3435 and the third circuit 3437 are configured to control and activate the first circuit 3433.

The first circuit 3433 is separated by the notch 39. That is, the first circuit 3433 includes a first sub-circuit 343A and a second sub circuit 343B. The first sub-circuit 343A can be disposed along the sub-border 341A, and the first sub-circuit 343A can be attached to the sub-border 341A. The second sub-circuit 343B can be disposed along the sub-border 341B, and the second sub-circuit 343B can be attached to the sub-border 341B.

In this embodiment, the drive circuit module 343 can further include a bottom circuit 3436, a first conductor 3438, and a second conductor 3439.

The bottom circuit 3436 can be disposed along the bottom side 393, and the bottom circuit 3436 can be attached to the bottom side 393.

The bottom circuit 3436 can be electrically coupled to the sub-circuit 343A via the first conductor 3438, and the first conductor 3438 can be arranged along a direction in which the first lateral side 391 extends. The bottom circuit 3436 can be electrically coupled to the sub-circuit 343B via the second conductor 3439.

The second conductor 3439 can be arranged along a direction in which the lateral side 392 extends.

In summary, the drive circuit module 343 can surround the periphery of the liquid crystal display layer 341. When the backlight 32 emits light to the LCD panel 34, the liquid crystals of the liquid crystal layer 341 twist and untwist at varying degrees to allow light passing through, thus producing a visible image.

Figure 8:
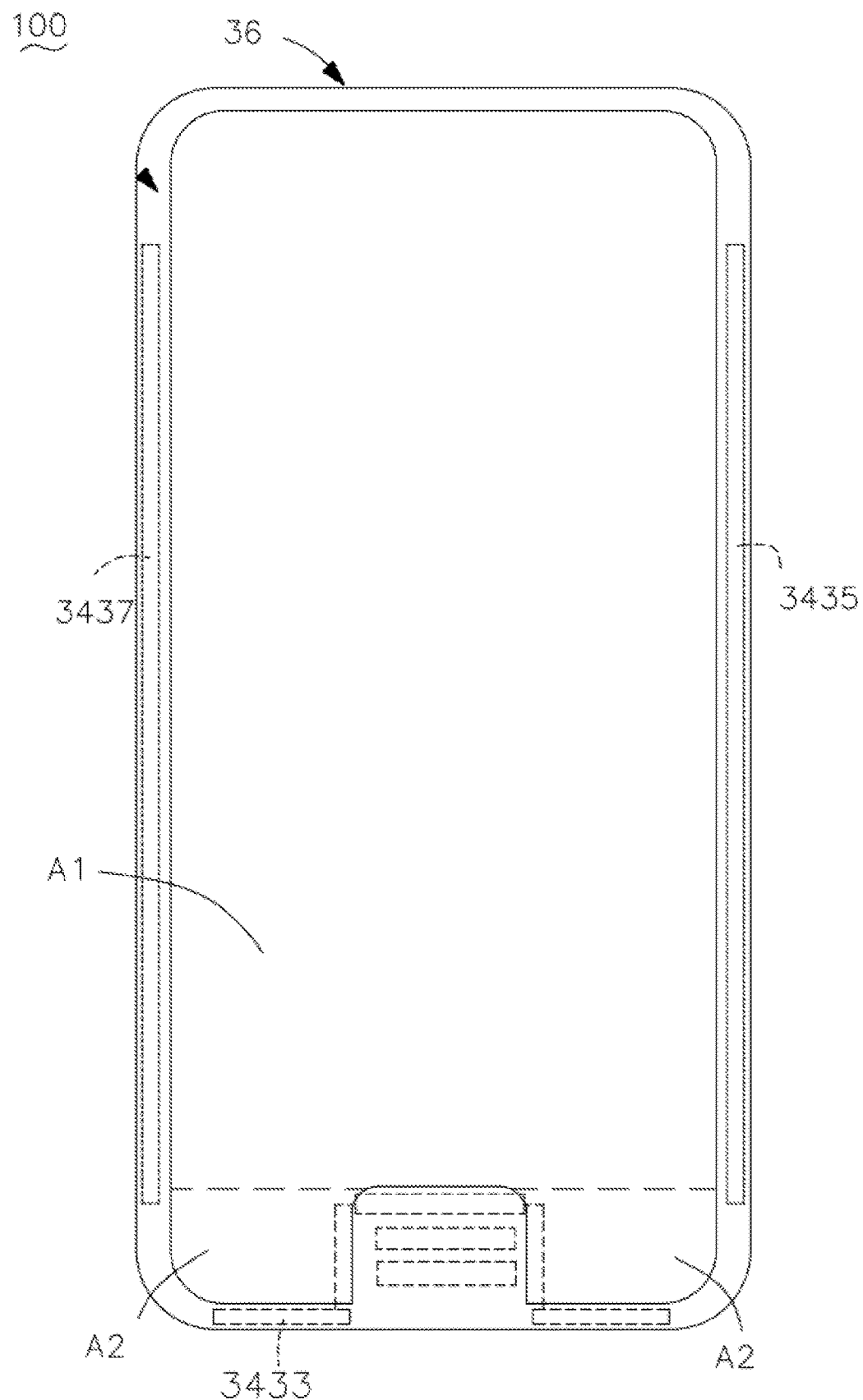
FIG. 8 illustrates a schematic projection view of the display module of FIG. 7

Referring to FIG. 8, a whole display area of the LCD panel 34 extends from a main display area A1 to two additional display areas A2 at opposite sides of the notch 39. The main display area A1 and the additional display areas A2 each are generally rectangular. As such, the overall display area of the LCD panel 34 is increased, although a notch 39 is defined in the LCD panel 34 to receive the function module 50.

Figure 9:
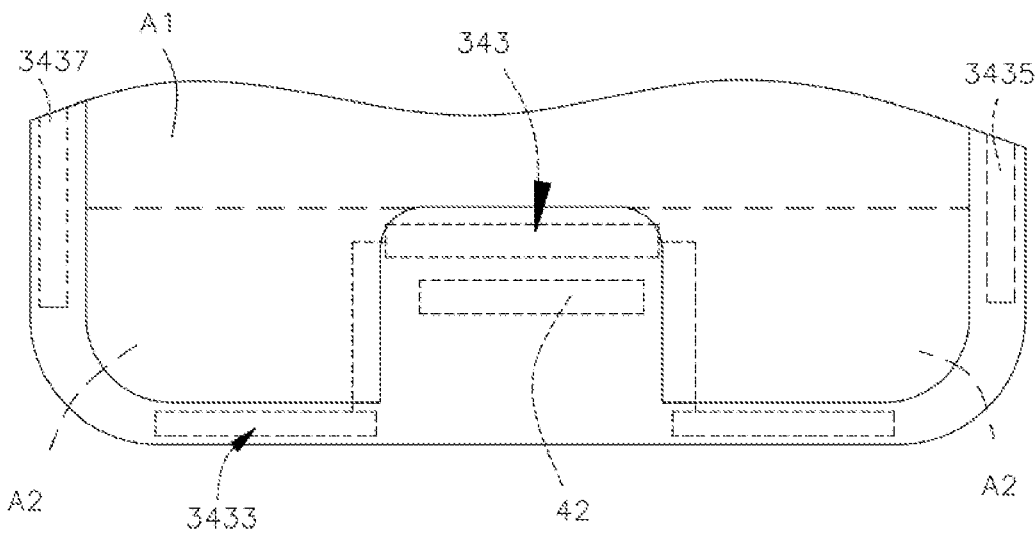
FIG. 9 illustrates a schematic partial enlargement view of the display module of FIG. 8.

As illustrated FIG. 9, in this embodiment, the display module 30 can further include a driver chip 42. The drive chip 42 can be coupled to the drive circuit module 343 and the PCB 70. The drive chip 42 can be configured to control the drive circuit module 343. In this embodiment, the drive chip 42 can be arranged in the notch 39.

Figure 10:
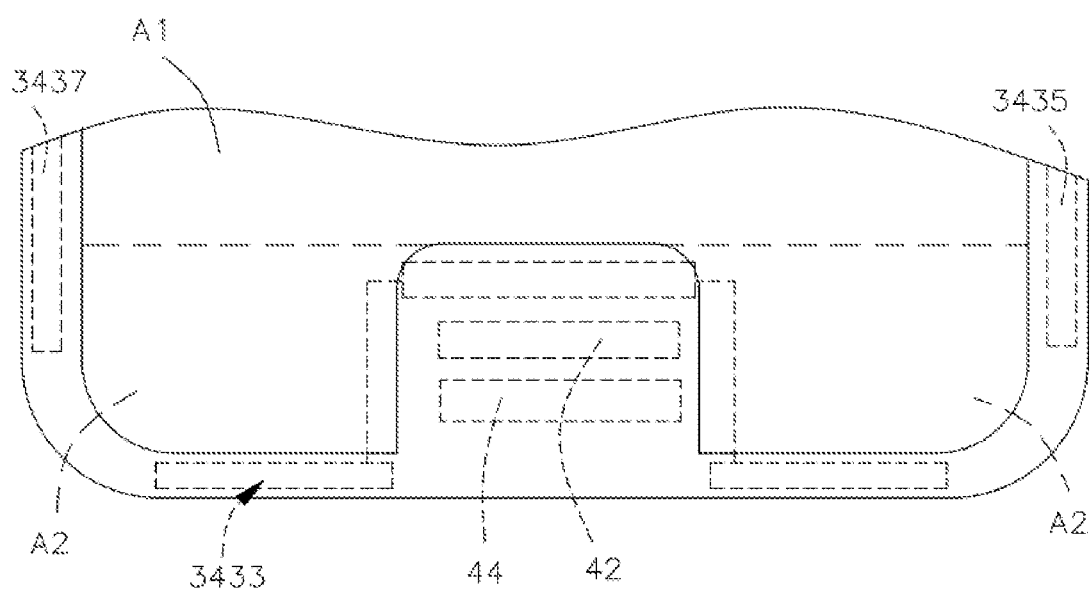
FIG. 10 illustrates a schematic partial enlargement view of a display module, in accordance with another embodiment of the present disclosure.

As illustrated FIG. 10, in alternative embodiments, other electronic components may be introduced and received in the notch 39. In a typical example, the display module 30 can further include a flexible printed circuit (FPC) 44. The FPC 44 can be coupled to the drive circuit module 343 and the PCB 70. The FPC 44 can be configured to connect the drive circuit module 343 to the PCB 70. In use, the FPC 44 is flexible, thus the FPC 44 can be folded and received in the notch 39.

In some embodiment, a display module is provided in accordance with another embodiment of present disclosure. The display module includes an LCD panel having a liquid crystal layer and a drive circuit coupled to the liquid crystal layer. The liquid crystal layer defines a notch at a border thereof. The drive circuit module includes a first circuit coupled to the border of the liquid crystal layer, and a second circuit and a third circuit coupled to other borders of the liquid crystal layer. The first circuit is separated by the notch. The second circuit and the third circuit are opposite to each other, and both coupled to the first circuit. An electronic device having the above mentioned display module is also provided in accordance with another embodiment of present disclosure.

In some embodiment, a display module is provided in accordance with still another embodiment of present disclosure. The display module includes an LCD panel having a liquid crystal layer and a drive circuit coupled to the liquid crystal layer. The liquid crystal layer includes a first border, a second border, a third border, and a fourth border. The first border defines a notch therein. The second border is coupled to the first border. The third border is coupled to the second border and opposite to the first border. The fourth border is opposite to the second border and disposed between the first border and the third border. The liquid crystal layer defines a notch at the first border. The drive circuit module includes a first circuit coupled to the first border, a second circuit coupled to the second border, and a third circuit coupled to the fourth border. The first circuit is separated by the notch. The second circuit and the third circuit are opposite to each other, and both coupled to the first circuit. An electronic device having the above mentioned display module is also provided in accordance with another embodiment of present disclosure.

It should be understood that, the display module 30 can be applied in any suitable display device and electronic device. Each display device according to the embodiment and others is applicable to electronic device in various fields, including a television apparatus, a digital camera, a notebook personal computer, a mobile terminal device such as a mobile phone, and a video camera. In other words, the display is applicable to electronic units in various fields which display externally-input or internally-generated video signals as still or video images.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

The invention claimed is:

1. A display module, comprising:
   a liquid crystal display (LCD) panel having:
      a liquid crystal layer defining a notch at a first border thereof, the first border comprising two sub-borders at opposite sides of the notch, and the liquid crystal layer comprising a first lateral side, a second lateral side, and a bottom side each in the notch; and
      a drive circuit module coupled to the liquid crystal layer:
   wherein the drive circuit module comprises a first circuit, a bottom circuit, a first conductor, and a second conductor; the first circuit comprises two sub-circuits at opposite sides of the notch, and each of the sub-circuits is disposed along and attached to a corresponding sub-border, the first circuit is configured to apply voltage across the liquid crystal layer; the bottom circuit is disposed along and attached to the bottom side; the first conductor is disposed along the first lateral side, and is coupled between the bottom circuit and one of the sub-circuits; and the second conductor is disposed along the second lateral side, and is coupled between the bottom circuit and another sub-circuit.

2. The display module as claimed in claim 1, wherein the drive circuit module surrounds the liquid crystal layer.

3. The display module as claimed in claim 2, wherein the bottom side is disposed between the first lateral side and the second lateral side; the first lateral side is coupled to one of the sub-borders, and the second lateral side is coupled to another sub-border.

4. The display module as claimed in claim 3, wherein the first lateral side is perpendicular to the bottom side and one of the two sub-borders, and the second lateral side is perpendicular to the bottom side and another sub-border.

5. The display module as claimed in claim 4, wherein the liquid crystal layer further comprises a second border and a fourth border substantially parallel to each other, the drive circuit module further comprises a second circuit and a third circuit, the second circuit is disposed along and attached to the second border, the third circuit is disposed along and attached to the fourth border, and the second circuit and the third circuit are configured to control and activate the first circuit.

6. The display module as claimed in claim 1, wherein the liquid crystal layer comprises:
 a second border, coupled to the first border a third border, coupled to the second border and opposite to the first border; and
 a fourth border opposite to the second border and disposed between the first border and the third border;
 the drive circuit module comprises:
 a second circuit, coupled to the second border; and
 a third circuit, coupled to the fourth border.

7. The display module as claimed in claim 1, wherein the display module further comprises a cover and a back light disposed on two opposite sides of the LCD panel; the cover comprises:
 a visible effective display region through which the light from the backlight passing; and
 a visible non-display region corresponding to the notch.

8. The display module as claimed in claim 1, further comprising a drive chip disposed in the notch and coupled to the drive circuit module, and the drive chip being configured to control the drive circuit module.

9. The display module as claimed in claim 1, further comprising a flexible printed circuit (FPC) coupled between the drive circuit module and a printed circuit board (PCB), wherein the flexible printed circuit is folded and disposed in the notch.

10. A display module, comprising:
 a cover having:
 a visible effective display region;
 a visible non-display region coupled to the visible effective display region; and
 a liquid crystal display (LCD) panel stacked on the cover, and the LCD panel comprising:
 a liquid crystal layer facing the visible effective display region and defining a notch at a first border thereof, the notch facing the visible non-display region; and
 a drive circuit module surrounding and coupled to the liquid crystal layer;
 wherein the display module further comprises a flexible printed circuit (FPC) and a drive chip; the FPC connects the drive circuit module to a printed circuit board (PCB), the FPC is folded and received in the notch; the drive chip is coupled to the drive circuit module and the PCB, the drive chip is configured to control the drive circuit module and is arranged in the notch; the drive circuit module comprises a first circuit configured to apply voltage across the liquid crystal layer, the first border comprises two sub-borders at opposite sides of the notch, and the first circuit comprises two sub-circuits respectively disposed along and attached to the two sub-borders.

11. The display module as claimed in claim 10, further comprising a backlight stacked to the LCD panel and configured to apply light to the LCD panel.

12. The display module as claimed in claim 10, wherein the liquid crystal layer further comprises a first lateral side, a second lateral side, and a bottom side in the notch; the bottom side is disposed between the first lateral side and the first lateral side; the first lateral side is coupled between the bottom side and one of the sub-borders, and the second lateral side is coupled between the bottom side and another sub-border.

13. The display module as claimed in claim 12, wherein the drive circuit module further comprises a bottom circuit, the bottom circuit is disposed along and attached to the bottom side.

14. The display module as claimed in claim 13, wherein the drive circuit module further comprises a first conductor and a second conductor; the first conductor is coupled between the bottom circuit and one of the sub-circuits, and the first conductor is disposed along the first lateral side; the second conductor is coupled between the bottom circuit and another sub-circuit, and the second conductor is disposed along the second lateral side.

15. An electronic device, comprising:
 a printed circuit board (PCB);
 a drive chip coupled to the PCB;
 a liquid crystal display (LCD) panel defining a notch therein, the LCD panel comprising:
 a liquid crystal layer comprising two sub-borders, a first lateral side, a second lateral side and a bottom side; the two sub-borders being positioned at two opposite sides of the notch and spaced from each other by the notch; the first lateral side, the second lateral side and the bottom side being in the notch, the first lateral side being connected between the bottom side and one of the sub-boarder, and the second lateral side being connected between the bottom side and another sub-border; and
 a drive circuit module surrounding the liquid crystal layer;
 wherein the drive chip is arranged in the notch, coupled to the drive circuit module, and configured to control the drive circuit module; the drive circuit module comprises a bottom circuit disposed along and attached to the bottom side, a first conductor disposed along the first lateral side, a second conductor disposed along the second lateral side, and a first circuit configured to apply voltage across the liquid crystal layer, the first circuit comprises two sub-circuits each disposed along and attached to a corresponding sub-border; the first conductor is coupled between the bottom circuit and one of the sub-circuits, the second conductor is coupled between the bottom circuit and another sub-circuit.

16. The electronic device as claimed in claim 15, further comprising a function module coupled to the PCB, wherein the function module is received in the notch.

17. The electronic device as claimed in claim 15, further comprising a resin layer and a backlight, the LCD panel being sandwiched between the resin layer and the backlight, the notch penetrating through the resin layer and the backlight.

18. The electronic device as claimed in claim 15, wherein the first lateral side is perpendicular to the bottom side and one of the two sub-borders, and the second lateral side is perpendicular to the bottom side and another sub-border.

19. The electronic device as claimed in claim 15, wherein the liquid crystal layer further comprises a second border and a fourth border substantially parallel to each other, the drive circuit module further comprises a second circuit and a third circuit, the second circuit is disposed along and attached to the second border, the third circuit is disposed along and attached to the fourth border, and the second circuit and the third circuit are configured to control and activate the first circuit.

20. The electronic device as claimed in claim 17, further comprising a housing, wherein the PCB is received in the housing and disposed close to the backlight.

\* \* \* \* \*